United States Patent
Messenger et al.

(10) Patent No.: US 6,534,936 B2
(45) Date of Patent: *Mar. 18, 2003

(54) DISK DRIVE EMPLOYING METHOD OF SPINNING UP SPINDLE MOTOR INCLUDING DETECTING BEMF POLARITY CHANGE FOR SELECTING INITIAL COMMUTATION STATE

(75) Inventors: Carl R. Messenger, Mission Viejo, CA (US); Russ A. Quisenberry, San Jose, CA (US)

(73) Assignee: Western Digital Technologies, Inc., Lake Forest, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 15 days.

(21) Appl. No.: 09/560,918

(22) Filed: Apr. 28, 2000

(65) Prior Publication Data

US 2002/0084760 A1 Jul. 4, 2002

(51) Int. Cl.[7] .................................................. H02P 6/02
(52) U.S. Cl. ........................................ 318/254; 318/138
(58) Field of Search ................................. 318/254, 439, 318/138, 139, 685, 696, 430, 431, 721, 722, 802, 803

(56) References Cited

U.S. PATENT DOCUMENTS

| | | | |
|---|---|---|---|
| 5,223,771 A | | 6/1993 | Chari |
| 5,382,889 A | * | 1/1995 | Peters et al. ................. 318/254 |
| 5,397,972 A | | 3/1995 | Maiocchi |
| 5,471,353 A | | 11/1995 | Codilian et al. |
| 5,530,326 A | | 6/1996 | Galvin et al. |
| 5,623,379 A | | 4/1997 | Nishimura et al. |
| 5,650,886 A | | 7/1997 | Codilan et al. |
| 5,909,095 A | * | 6/1999 | Sakti et al. .................. 318/254 |
| 6,081,091 A | * | 6/2000 | Mitchell et al. ............. 318/685 |
| 6,104,153 A | | 8/2000 | Codilian et al. |

OTHER PUBLICATIONS

Raffi Codilian, Don Stupeck—"A Multi Mode Spindle Selection Within a Disk Drive System," Incremental Motion Control Systems Symposium, 1995.
Raffi Codilian, Don Stupeck—"An Optimization Method of Spindle Motor and Driver Selection Within a Disk Drive System," Incremental Motion Systems Symposium, 1995.

* cited by examiner

Primary Examiner—Khanh Dang
(74) Attorney, Agent, or Firm—W. Chris Kim, Esq.; Milad G. Shara, Esq.; Knobbe, Martens, Olson & Bear, LLP (57) ABSTRACT

A disk drive is connectable to a power supply voltage and includes a spindle motor, a spindle motor driver, a spindle motor controller, and a detector. The spindle motor has windings and a rotatable rotor. The spindle motor driver is connected to the windings and connectable to the voltage. The spindle motor controller commands the spindle motor driver to apply the voltage across at least one of the windings to cause the rotor to rotate, which induces a BEMF having a polarity across each of the windings. The spindle motor controller subsequently commands the spindle motor driver to remove the applied voltage across the windings, and the detector monitors the BEMF in each of the windings to detect the polarity of the BEMF in each of the windings to generate a previous multi-bit sequence representing a previous phase position ($\hat{\theta}_n$) of the rotor and subsequently detect a change in the polarity of the BEMF in one of the windings to generate a present multi-bit sequence representing a present position ($\theta_n$) of the rotor. The spindle motor controller is responsive to the previous phase position ($\hat{\theta}_n$) and the present phase position ($\theta_n$) of the rotor for selecting an initial commutation state for commanding the spindle motor driver to initiate a spin-up commutation sequence starting from the selected initial commutation state such that the voltage is sequentially applied across a selected combination of the windings in order to spin-up the spindle motor to an operating spin-rate.

13 Claims, 8 Drawing Sheets

DISK DRIVE EMPLOYING METHOD OF SPINNING UP SPINDLE MOTOR INCLUDING DETECTING BEMF POLARITY CHANGE FOR SELECTING INITIAL COMMUTATION STATE

BACKGROUND OF THE INVENTION

1. Field of the Invention

The present invention generally relates to spinning up a spindle motor in a hard disk drive. More particularly, the present invention relates to a disk drive employing a method of spinning up a spindle motor including detecting back electromotive force (BEMF) polarity change for selecting an initial commutation state for the spindle motor.

2. Description of the Prior Art

A huge market exists for hard disk drives for mass-market host computer systems such as M servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

In hard disk drives, data is stored on magnetic media disks in concentric data tracks, which are divided into groups of data sectors. Disks are typically stacked on a spindle assemble. The spindle assembly is mechanically coupled to a spindle motor which rotates the disks at a substantially constant operating spin-rate. The hard disk drive performs a spin-up operation to bring previously stopped disks to the operating spin-rate. There exists substantial competitive pressure to develop mass-market hard disk drives having faster spin-up operations to more quickly begin reading from and/or writing to the magnetic disks after the disks are spun-down to zero or other spin-rate lower than the operating spin-rate, especially after power-on of the computer system that employs the hard disk drive.

A spindle motor driver typically drives the spindle motor. A typical three-phase spindle motor includes a stator having three windings and a rotor. The rotor has magnets that provide a permanent magnet field. The spindle motor generates torque on the rotor when current flows through at least one of the windings. The torque depends on upon the magnitude and direction of current flow through the windings and an angular position of the rotor relative to the stator. The functional relationship between torque and current flow and angular position is commonly depicted in a set of torque curves, each of which corresponds to a respective one of a set of commutation states.

Conventional spin-up operations in hard disk drives include a cogging operation which cogs or prepositions the rotor at a fixed angular phase position. The following example conventional spin-up operation data is provided for an example multi-platter disk drive. The cogging operation is performed at zero revolutions per minute (RPM) spin-rate. An example cogging operation takes approximately 1.3 seconds. A blind table operation, where the velocity of the spindle motor is not monitored, typically is performed for approximately 0.3 seconds from 0 to approximately 400 RPMs. The blind table operation starts the rotor at the cogged fixed angular position and a corresponding predetermined initial commutation state is used to initially a control the spindle motor to generate a positive torque to move the disks in a forward direction. At approximately 400 RPMs, an approximately 100 millisecond sync-up operation is typically required to sync-up the spindle motor to permit monitoring of its spin-rate. Once the spindle motor spin-rate has been detected and the sync-up operation is completed, a back electromotive force (BEMF) spin-up operation begins at the approximately 400 RPM spin-rate to spin-up to an operating spin-rate, such as 5,400 or 7,200 RPMs. The BEMF spin-up operation monitors the BEMF of the spindle motor to thereby monitor the spin-rate of the disks. After reaching the operating spin-rate, the spin-up operation is finished and control is handed off to the run mode operation of the spindle motor.

As can be seen by the above discussion, the cogging operation takes up a substantial portion of the spin-up operation in the disk drive. Furthermore, in the case of ramp load operations, there is no head on media friction during the spin-up operation. In this case, the cog operation can oscillate for many seconds without the damping effect provided by the head on the disk media.

For the reasons stated above, there is a need to reduce the spindle motor spin-up time in a disk drive. In particular, there is a need to reduce the time to perform the cog operation, which prepositions the rotor prior to the spin-up of the spindle motor.

SUMMARY OF THE INVENTION

The invention can be regarded as a method of spinning-up a spindle motor to an operating spin-rate during a spin-up operation in a disk drive. The spindle motor has a plurality of windings and a rotatable rotor. The method includes the step of applying a voltage across at least one of the windings to cause the rotor to rotate. The rotating rotor induces a BEMF having a polarity across each of the windings. The method also includes the step of removing the applied voltage across the windings. The method subsequently detects the polarity of the BEMF in each of the windings to generate a previous multi-bit sequence representing a previous phase position ($\hat{\theta}_n$) of the rotor. The method then detects a change in the polarity of the BEMF in one of the windings to generate a present multi-bit sequence representing a present phase position ($\theta_n$) of the rotor. The method uses the previous phase position ($\hat{\theta}_n$) and the present phase position ($\theta_n$) of the rotor for selecting an initial commutation state in a spin-up commutation sequence such that the voltage is sequentially applied across a selected combination of the windings in order to spin-up the spindle motor to the operating spin-rate.

The invention can also be regarded as a disk drive connectable to a power supply voltage. The disk drive includes a spindle motor having a plurality of windings and a rotatable rotor. The disk drive also includes a spindle motor driver connected to the windings and connectable to the voltage. The disk drive also includes a spindle motor controller for commanding the spindle motor driver to apply the voltage across at least one of the windings to cause the rotor to rotate. The rotating rotor induces a BEMF having a polarity across each of the windings. The spindle motor controller subsequently commands the spindle motor driver to remove the applied voltage across the windings. The disk drive also includes a detector for monitoring the BEMF in each of the windings while the voltage is removed across the windings. The detector performs the steps of detecting the polarity of the BEMF in each of the windings to generate a previous multi-bit sequence representing a previous phase position ($\hat{\theta}_n$) of the rotor and detecting a change in the polarity of the BEMF in one of the windings to generate a present multi-bit sequence representing a present phase position ($\theta_n$) of the rotor. The spindle motor controller is responsive to the previous phase position ($\hat{\theta}_n$) and the present phase position ($\theta_n$) of the rotor for selecting an initial commutation state for commanding the spindle motor driver to initiate a spin-up commutation sequence starting from the selected initial commutation state such that the voltage is sequentially applied across a selected combination of the windings in order to spin-up the spindle motor to an operating spin-rate.

DESCRIPTION OF THE PREFERRED EMBODIMENTS

Figure 1:
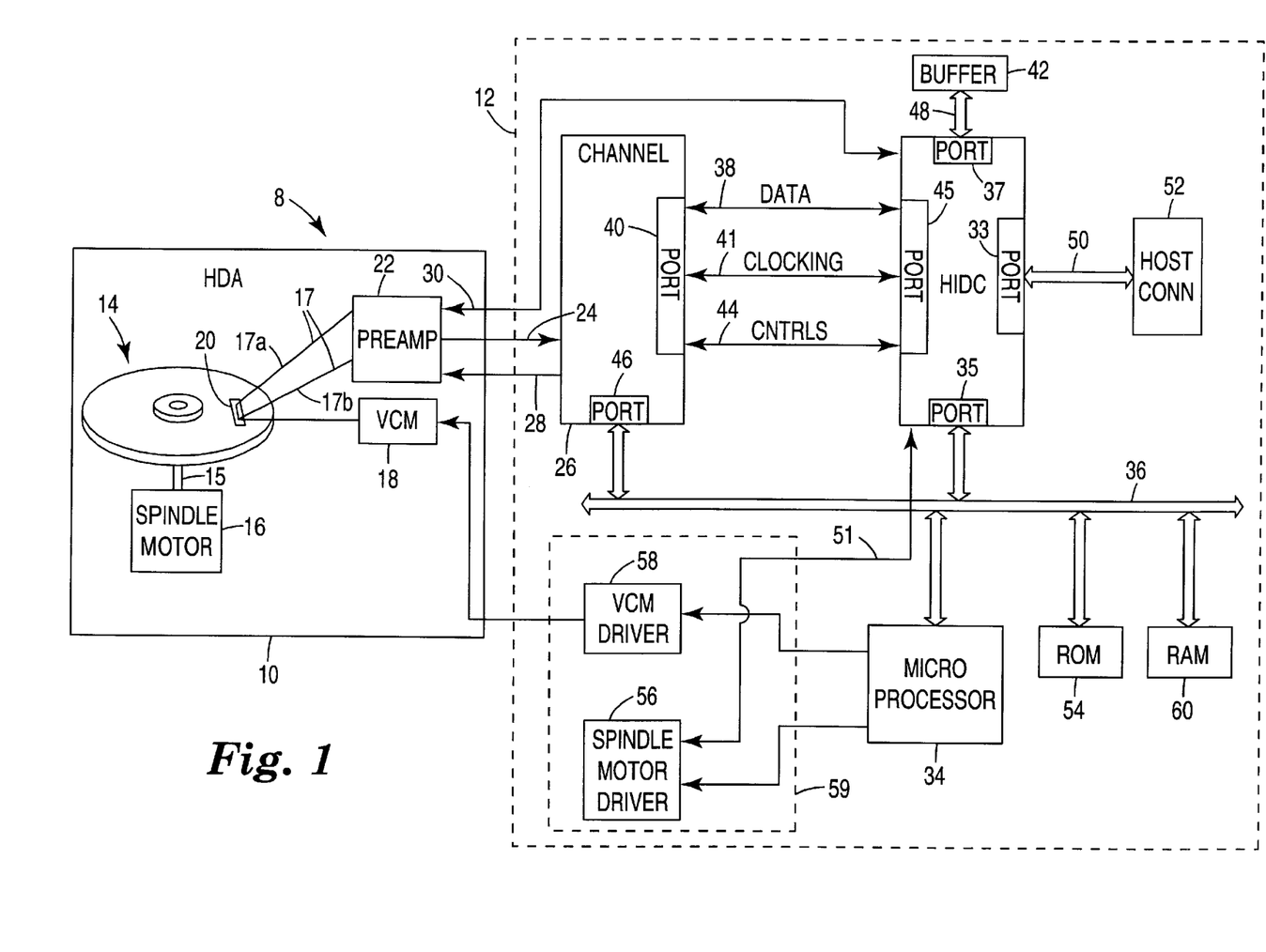
FIG. 1 is a block diagram of a hard disk drive according to an embodiment of the present invention.

Referring to FIG. 1, a disk drive 8 according to an embodiment of the present invention employs a method of spinning up a spindle motor, such as a spindle motor 16, by detecting back electromotive force (BEMF) polarity changes for selecting an initial commutation state for the spindle motor.

Disk drive 8 includes a head disk assembly (HDA) 10 and a printed circuit board assembly (PCBA) 12. HDA 10 includes a suitable number of magnetic disks 14 stacked on a spindle assembly 15, spindle motor 16, a voice coil motor (VCM) 18, and a preamplifier 22. Spindle motor 16 is mechanically coupled to spindle assembly 15 to cause disks 14 to rotate at a high spin-rate. Suitably, each disk 14 provides two recording surfaces. Each of the recording surfaces has a plurality of data tracks. In one embodiment, the data tracks are arranged in an embedded servo format having interspersed servo-information regions and user-data regions.

Each of a suitable number of transducers 20 provides for reading from and writing to a respective one of the recording surfaces of disks 14. Transducers 20 can include separate read and write transducers. When reading, each transducer 20 generates a low level analog read signal 17b. Analog read signal 17b is conveyed to signal inputs of preamplifier 22. Preamplifier 22 produces a read signal 24 which is an amplified analog read signal. HDA 10 also includes a path for conveying read signal 24 to PCBA 12; a path for conveying a write data signal 28 to preamplifier 22; and a path for conveying preamplifier control signals 30 for preamplifier 22. Under control of control signals 30, preamplifier 22 operates in either a read mode or a write mode and in either case communicates with a selected transducer 20.

During a write operation, preamplifier 22 provides write current via a write data signal 17a to a selected transducer 20 for writing a sequence of symbols on one of the recording surfaces of disk 14. The write current changes polarity upon each change in binary value of write data signal 28.

During a user-data read operation, low level read signal 17b (and corresponding amplified read signal 24) serially defines servo information and user data. The servo information includes gross-positioning data information including track identification data information, and fine-positioning information in the form of analog servo bursts.

Suitably, spindle motor 16 is a multi phase, brushless DC motor. Disk drive 8 employs a method according to the present invention for controlling spindle motor 16 to spin up to a substantially constant annular velocity, as described in more detail below. Well known techniques can be employed for controlling spindle motor 16 to spin down from, the substantially constant angular velocity.

VCM 18 is an element of a head-positioning servo system, and applies torque to a head stack assembly (not shown), which includes transducer 20, to swing the head stack assembly during a track-seeking operation and to maintain it at a desired angular position during a track-following operation.

PCBA 12 includes a channel 26 and a host interface and disk controller ("HIDC 32"). In one embodiment, channel 26 and HIDC 32 are each implemented as a single IC, and these two ICs in combination perform overall functions including basic timing functions. One such basic timing function entails the generation of the "global clock" and the synchronization of the global clock to the servo sample rate. In one embodiment, HIDC 32 contains circuitry for generating the global clock which is synchronized to the servo sample rate by a signal supplied by channel 26. In addition, HIDC 32 contains timing circuitry controlled by the global clock to provide timing signals used in de-multiplexing including separating servo data information from servo bursts and from user data. Alternatively, channel 26 includes the global clock and timer circuitry.

Channel 26 is coupled to receive read signal 24 and provides a signal processing path (i.e., read channel) for processing read signal 24 to produce a clocked, serial-by-symbol data signal (i.e., a decoded binary data signal and accompanying clock signal). Channel 26 also provides a signal processing path (i.e., write channel) for processing a clocked serial-by-symbol data signal provided by HIDC 32 to produce serial-by-bit write data signal 28 for the analog signal input of preamplifier 22. The serial-by-symbol data signals propagate between a port 40 in channel 26 and a port 45 in HIDC 32 via a channel data bus 38. The clock signals for the serial-by-symbol data signals between channel 26 and HIDC 32 are indicated as CLOCKING 41.

HIDC 32 performs numerous control functions for disk drive 8 including host interface functions to manage transfer of data between the disk drive and the host, and certain disk controller functions to manage the operation of channel 26 in writing and reading data. Incident to such disk controller functions, HIDC 32 has circuitry for producing certain timing and control signals that are part of a set identified collectively as timing and control (CNTRLS) signals 44 which are sent between channel 26 and HIDC 32.

PCBA 12 also includes a data buffer 42, a microprocessor 34, a read only memory (ROM) 54, a writeable random access memory (RAM) 60, a VCM driver 58 for supplying current to VCM 18, and a spindle motor driver 56 for supplying current to spindle motor 16. In one embodiment, VCM driver 58 and spindle motor driver 56 are implemented in a power device 59.

PCBA 12 also includes: a host interface bus 50 for conveying commands and data between HIDC 32 and the host, a microprocessor bus 36; a buffer bus 48 for conveying data between HIDC 32 and data buffer 42; a path for conveying control signals 30 that provide for bi-directional control interactions between preamplifier 22 and HIDC 32; and paths for conveying control signals 51 that provide for bi-directional control interactions between spindle motor driver 56 and HIDC 32.

Microprocessor 34 executes instructions acquired from a stored control program to control disk drive functions. These functions include reading and decoding host commands, starting up and controlling the speed of spindle motor 16 via HIDC 32, minimizing head-positioning servo off track error through control of VCM 18, managing reduced power modes of operation, and other disk drive functions. Microprocessor 34 includes an I/O port that is connected to microprocessor bus 36.

Microprocessor 34 suitably includes an embedded ROM or other non-volatile memory, such as flash memory, that stores some of the control programs it uses. Here, control programs include the instructions microprocessor 34 executes, and tables, parameters or arguments used during the execution of these programs. Microprocessor control programs may also reside in any or all of ROM 54, RAM 60, or data buffer 42. Microprocessor 34 suitable also includes a register set and a RAM.

ROM 54 is an optional conventional ROM IC that stores at least part of the control program used by microprocessor 34. ROM 54 may be omitted in an embodiment in which microprocessor 34 includes embedded ROM suitable for replacing the functions of ROM 54. Alternatively, ROM 54 is replaced by programmable non-volatile memory, such as flash memory.

RAM 60 is an optional conventional RAM IC used to enlarge the high speed writeable memory available to microprocessor 34. RAM 60 is included in PCBA 12 when microprocessor 34 lacks sufficient internal RAM, and data buffer 42 cannot provide microprocessor 34 sufficient external storage or sufficiently fast external storage.

Channel 26 has a port 46 and HIDC 32 has a port 35 that connect to microprocessor bus 36 to permit microprocessor 34 to directly communicate with channel 26 and HIDC 32. Microprocessor bus 36 also enables microprocessor 34 to communicate directly with ROM 54 and RAM 60.

Channel 26 includes circuitry to process read signal 24, and, on a time-multiplexed basis, generate decoded digital user data, decoded digital servo information data, and a digital representation of demodulated servo burst data. The decoded digital servo information data and decoded digital user data are conveyed to HIDC 32 via port 40, channel data bus 38, and port 45. Microprocessor 34 acquires the demodulated servo burst data via microprocessor port 46 and microprocessor bus 36, and uses the demodulated servo burst data to perform fine-position head-positioning servo operations. An alternative embodiment incorporates servo control circuitry in a servo IC in which case the demodulated servo burst data is provided to such IC.

HIDC 32 also includes a buffer port 37 connected to buffer bus 48, and host interface port 33 connected to host-interface bus 50. HIDC 32 includes buffer manager-arbitrator circuitry that manages access to data buffer 42 and manages bi-directional exchange of data between HIDC 32 and data buffer 42 via buffer bus 48. Host interface port 33 provides for communicating with the host via host interface bus 50 and host connection 52. The host can be any electronic system, such as a computer system, that has an input/output (I/O) bus and interface connection means that is compatible with host connection 52, host interface bus 50, and host interface port 33.

HIDC 32 also controls disk formatting and address translation. The translating of addresses includes translating a logical block address to a cylinder/head/sector address and provides for defect management. HIDC 32 also includes error detection and correction circuitry that is used to correct errors in user data that were read from disks 14 and stored in data buffer 42.

Data buffer 42 stores data recovered from a disk 14, data provided by the host to be recorded on a disk 14, and, optionally, disk drive commands, servo information data, and control aid programs for microprocessor 34. The buffer manager within HIDC 32 arbitrates access to data buffer 42 when contention for access to data buffer 42 occurs as a consequence of various concurrent operations. Disk drive commands received from the host may be stored in data buffer 42 and be subsequently retrieved by microprocessor 34. Data buffer 42 preferably has sufficient capacity to hold multiple sectors of user data for both read and write operations.

Spindle Motor Operation

Figure 2:
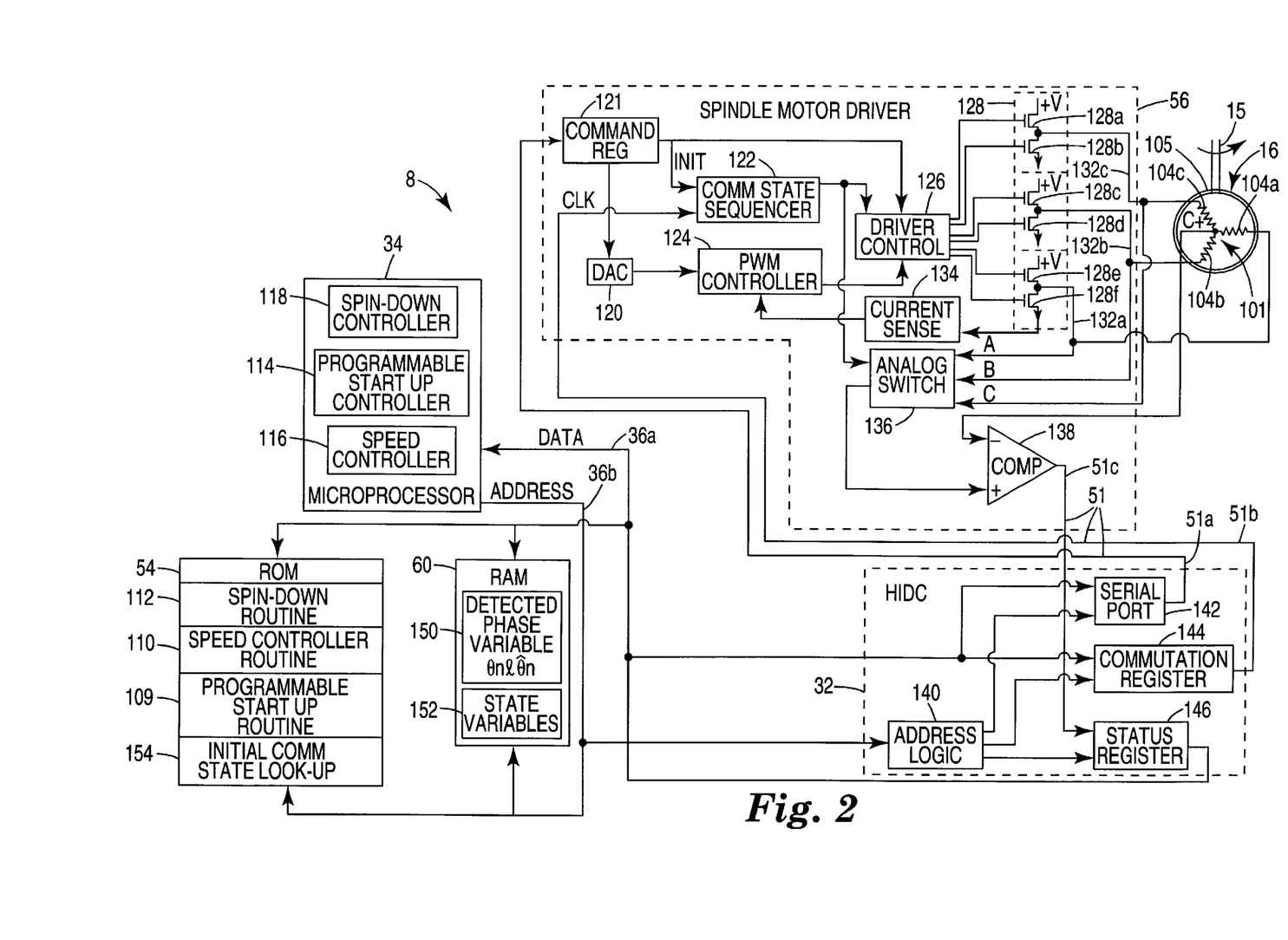
FIG. 2 is a more detailed schematic diagram of a portion of the hard disk drive of FIG. 1.

FIG. 2 illustrates certain portions of disk drive 8 relevant to an embodiment of the present invention in more detail in schematic and block diagram form. The embodiment of spindle motor 16 illustrated in FIG. 2 includes a stator 101 having three windings 104a (winding A), 104b (winding B), and 104c (winding C) electrically arranged in a Y configuration, and a rotor 105. In one exemplary embodiment, spindle motor 16 is implemented in an eight pole, three-phase DC brushless motor.

Rotor 105 has magnets that provide a permanent magnetic field. Spindle motor 16 generates torque ($T_d$) on rotor 105 when current ($I_m$) flows through at least one of windings 104. $T_d$ depends upon the magnitude and direction of current flow through the windings 104, and the angular position of rotor 105 relative to stator 101. The functional relationship between torque and current flow and angular position is commonly depicted in a set of torque curves, each of which corresponds to a respective one of a set of commutation states. Such torque curves are illustrated in FIG. 3 and are described in more detail below.

Various firmware routines are stored in memory locations in ROM 54 for controlling the operation of spindle motor 16. For example, a programmable startup routine 109, a speed controller routine 110, and a spin-down routine 112 are stored in ROM 54 for controlling spindle motor 16 during start-up, running, and spin-down of spindle motor 16. Microprocessor 34 preferably comprises a digital signal processor that runs routines 109, 110, and 112 to control spindle motor 16.

During a start-up operation of spindle motor 16, microprocessor 34 responds to a startup command to receive and execute programmable startup instructions from programmable start-up routine 109 of ROM 54 to form a programmable start-up controller 114 within microprocessor 34.

Similarly, during a run operation of spindle motor 16, microprocessor 34 receives and executes speed controller instructions from speed controller routine 110 of ROM 54 to form a speed controller 116 within microprocessor 34.

During a spin-down operation of spindle motor 16, microprocessor 34 responds to a spin-down command to receive and execute spin-down instructions from spin-down routine 112 to form a spin-down controller 118 within microprocessor 34.

Microprocessor 34 and HIDC 32 together function as a spindle motor controller for commanding spindle motor driver 56 to apply a voltage (+V) across at least one winding of windings 104 to cause rotor 105 to rotate. Rotor 105 rotating induces a BEMF having a polarity across each of windings 104. Microprocessor 34 and HIDC 32 functioning as the spindle motor controller also subsequently command spindle motor driver 56 to remove the applied voltage (+V) across windings 104.

HIDC 32 includes address logic 140, a serial port 142, a commutation register 144, and a status register 146 for implementing its portion of the spindle motor controller function. Microprocessor 34 provides data to serial port 142 and commutation register 144 via microprocessor data bus 36a. Microprocessor 34 reads data from status register 146 via microprocessor data bus 36a. Microprocessor 34 provides addresses to address logic 140 via microprocessor address bus 36b. Address logic 140 responds to the received addresses from microprocessor address bus 36b to select serial port 142 or commutation register 144 to be written by microprocessor 34 or to select status register 146 to be read by microprocessor 34.

As illustrated in FIG. 2, write data is provided to and read data is provided from ROM 54 and RAM 60 from/to microprocessor data bus 36a. Addresses are provided from microprocessor 34 to ROM 54 and RAM 60 for writing and reading data via microprocessor address bus 36b.

Microprocessor 34 serially provides spindle motor commands to serial port 142 of HIDC 32. The spindle motor commands are generated by programmable start-up controller 114 during start-up operations, by speed controller 116 during run operations, and by spin-down controller 118 during spin-down operations. Example spindle motor commands include run commands for controlling the running of spindle motor 16, coast commands to trigger spindle motor 16 to coast, and brake commands which triggers spindle motor 16 to brake.

Spindle motor driver 56 includes a digital-to-analog converter (DAC) 120; a command register 121; a commutation state sequencer 122; a pulse width modulation (PWM) controller 124; a driver control 126; switching elements 128; a current sense circuit 134; an analog switch 136; and a comparator 138. Control signals 51 provide for bi-directional control interactions between spindle motor driver 56 and HIDC 32.

Serial Port 142 of HIDC 32 provides a representative form of the microprocessor generated spindle motor commands to command register 121 via a command line 51a. For example, command register 121 provides a current command to DAC 120 which correspondingly provides a corresponding analog signal to PWM controller 124 which controls the amount of current supplied to spindle motor 16. Command register 121 also provides commands to driver control 126 to control the operation of switching elements 128 based on the type of command in command register 121. Command register 121 also provides an initialization command to commutation state sequencer 122 to reset the state of commutation state sequencer to "0" or another predetermined reset state.

Microprocessor 34 writes to commutation register 144 via microprocessor data bus 36a to change the state of commutation register 144. Commutation register 144 responds to this control from microprocessor 34 to provide a commutation clock on clock line 51b to commutation state sequencer 122. Commutation state sequencer 122 increments its state with every new commutation clock pulse from commutation register 144 on clock line 51b.

During the run state, commutation state sequencer 122 sequences through a set of six commutation states corresponding to a set of torque curves to control switching elements 128 which drive spindle motor 16 via driver control 126 to maximize the peak positive torque produced by spindle motor 16.

During the run state, speed controller 116 within microprocessor 34 provides current commands to command register 121 via serial port 142. The output of command register 121 is provided to DAC 120 which converts the current command into an analog signal. The analog signal from DAC 120 is provided to PWM controller 124. PWM controller 124 provides a PWM control signal to power driver control circuit 126 for controlling current flowing through windings 104a, 104b, and 104c. Power driver control circuit 126 has six lines which are each coupled to a gate of a corresponding one of power metal oxide semiconductor field effect transistors (MOSFETs) 128a, 128b, 128c, 128d, 128e, and 128f.

Power MOSFETs 128a-f form switching elements 128. Suitably, in an embodiment where all power MOSFETs 128a-f are implemented as N-channel MOSFETs, the drain of power MOSFET 128a is coupled to the positive power supply and its source is coupled to winding 104c via a line 132c. Power MOSFET 128a is paired with power MOSFET 128b, which has its source coupled to ground and its drain coupled to winding 104c via line 132c. Similarly, power MOSFET 128c has its drain coupled to the positive power supply and its source coupled to winding 104b via a line 132b, and is paired with power MOSFET 128d which has its source coupled to ground and its drain coupled to winding 104b via line 132b. Power MOSFET 128e has its drain coupled to the positive power supply and its source coupled to winding 104a via a line 132a, and is paired with power MOSFET 128f which has its source coupled to ground and its drain coupled to winding 104a via line 132a.

Each power MOSFET pair (i.e., 128a-128b, 128c-128d, and 128e-128f) form a tri-state switching element. Each tri-state switching element 128 includes a pair of MOSFETs which are in one of three possible states as follows: 1) the upper MOSFET (e.g., 128a) is on and the lower MOSFET (e.g., 128b) is off to switch the +V voltage to the corresponding winding 104 connected to the switching element; 2) the upper MOSFET (e.g., 128a) is off and the lower MOSFET (e.g., 128b) is on to couple the corresponding winding 104 to ground; and the tri-state condition where the upper MOSFET (e.g., 128a) and the lower MOSFET (e.g., 128b) are both off, such that the terminal of the winding 104 connected to the tri-stated switching element floats and no current flows through that winding. If either of the pair of MOSFETs in a tri-state switching element 128 is conducting, the switching element is referred to as a driven switching element and the winding 104 connected to the driven switching element is referred to as a driven winding. If neither MOSFET in a tri-state switching element 128 is conducting, the switching element is referred to as a tri-stated switching element or undriven switching element and the winding 104 connected to the tri-stated switching element is a floating winding.

Suitably, commutation state sequencer 122 via driver control 126 switches on two power MOSFETs 128 on opposite legs of windings 104 during each of the commutation run states, such as power MOSFET 128a and 128d. In this example, power MOSFET 128e and 128f are shut off so that no current flows through winding 104a, resulting in a floating winding. Thus, there is one floating winding for three-phase spindle motor 16 during each of the six commutation run states.

Current sense circuit 134 senses current flow through the switched on power MOSFETs 128 and provides a feedback signal to PWM controller 124 for controlling the current flowing through the switched on MOSFETs 128. During the example run operation where two power MOSFETs 128 on opposite legs of windings 104 are switched on during each of the commutation run states, PWM controller 124 controls the current flowing through the switched on power MOSFETs 128. If current sense circuit 134 indicates too much current flowing through the switched on power MOSFETs 128, PWM controller 124 overrides commutation state sequencer 122 to shut power MOSFETs 128 off until the current is at a more appropriate level.

In the run operation, microprocessor 34 serves as speed controller 116 to execute speed controller routine 110 out of ROM 54 and RAM 60. Microprocessor 34 functioning as speed controller 116 controls the spin-rate of spindle motor 16 to maintain a substantially constant spin-rate of disk 50. Microprocessor 34 commands PWM controller 124 via serial port 142, command register 121, and DAC 120 to control the current flowing through the switched on power MOSFETs 128 during run operations. Commutation state sequencer 122 operates during start-up and run operations by sequencing through commutation states to control which of power MOSFETs 128 are switched on and which are switched off so that peak positive torque will be generated for rotor 105 of spindle motor 16.

During a coast operation of disk drive 8, microprocessor 34 commands all of the power MOSFETs 128 off via serial port 142, command register 121, and driver control 126 so that the windings 104 of spindle motor 16 are floating and no current flows through windings 104 and substantially only frictional forces slow down spindle motor 16. During a dynamic braking operation of disk drive 8, microprocessor 34 commands the power MOSFETs 128 are on via serial port 142, command register 121, and driver control 126 in such a way to short windings 104 of spindle motor 16. With windings 104 shorted, there is no source voltage, therefore, a negative current and reverse braking torque are developed resulting from the BEMF of spindle motor 16.

Torque Curves

Figure 3A:
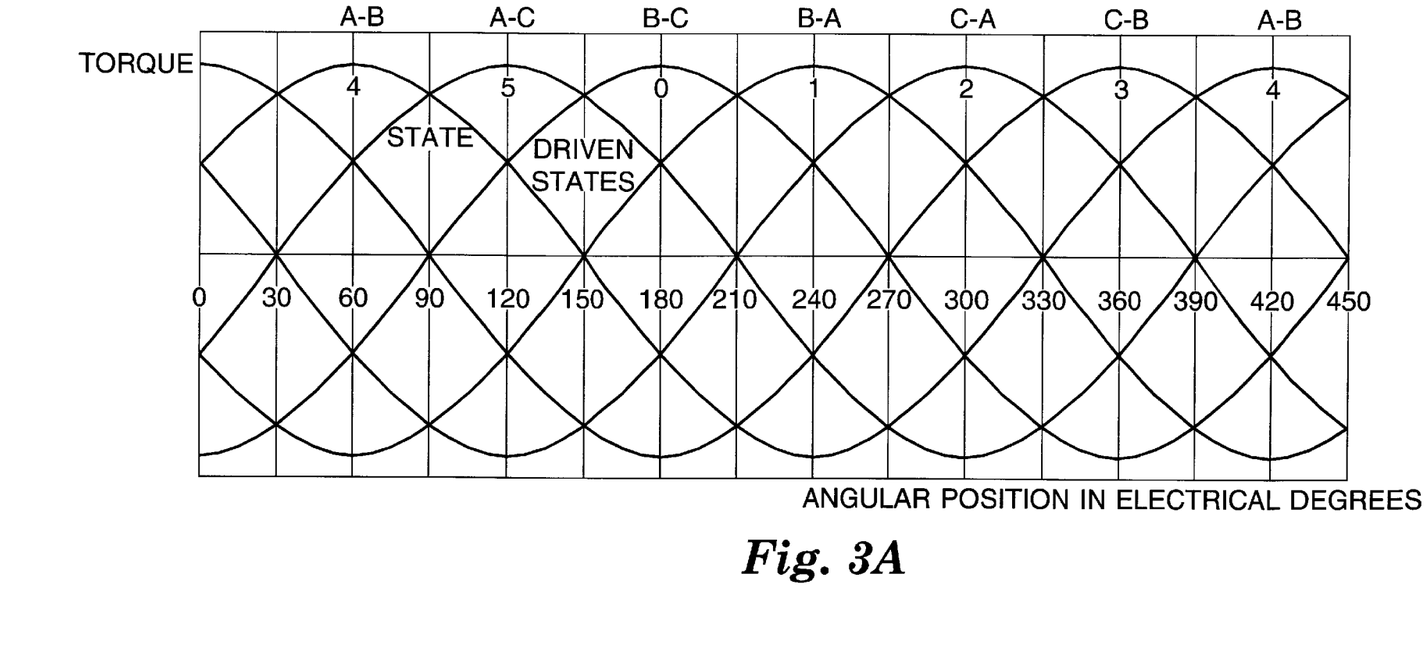
FIG. 3A is a diagram illustrating an example set of torque curves for a spindle motor of the hard disk of FIG. 1 which depict the functional relationship between torque, current flow, and angular position.

FIG. 3A illustrates a set of torque curves for spindle motor 16 which depict the functional relationship between torque and current flow and angular position. Each torque curves of the set of six torque curves corresponds to a respective one of a set of commutation states provided from commutation state sequencer 122. As described above, during each of the six commutation states, two of windings 104 will be driven while the third winding 104 is floating (i.e, undriven). The torque curves are illustrated in FIG. 3A relative to one cycle of each curve being 360 electrical degrees. The six commutation states are given in the following Table I.

TABLE I

| Commutation State | Driven Windings | Floating Winding |
|---|---|---|
| 0 | B-C | A |
| 1 | B-A | C |
| 2 | C-A | B |
| 3 | C-B | A |
| 4 | A-B | C |
| 5 | A-C | B |

As shown in FIG. 3A, from approximately 30° to 90°, peak positive torque is obtained by selecting commutation state 4 (A-B). Similarly, peak positive torque is obtained by: selecting commutation state 5 (A-C) from approximately 90° to 150°; selecting commutation state 0 (B-C) from approximately 150° to 210°; selecting commutation state 1 (B-A) from approximately 210° to 270°; selecting commutation state 2 (C-A) from approximately 270° to 330°; and selecting commutation state 3 (C-B) from approximately 330° to 390°.

Figure 3B:
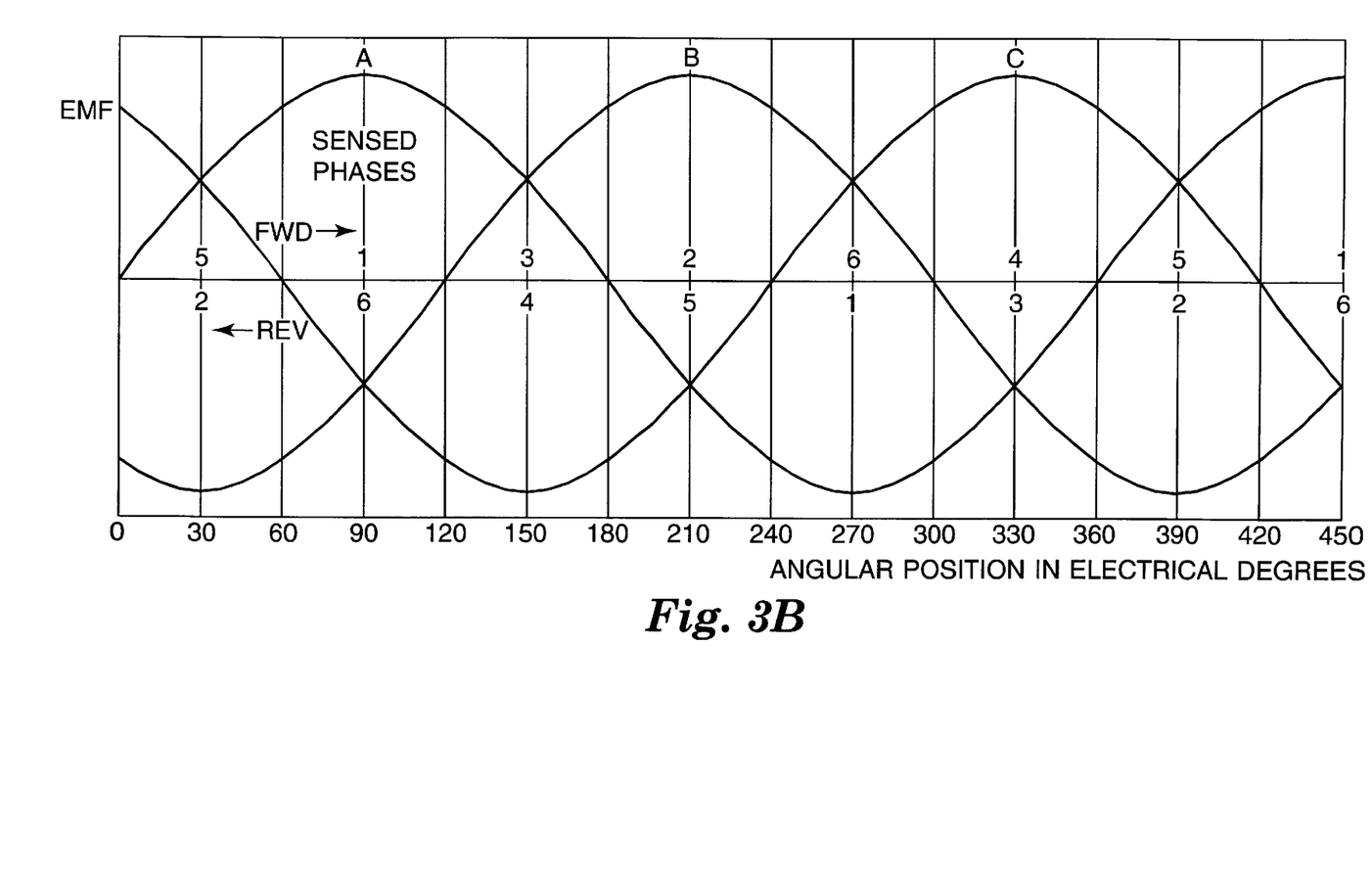
FIG. 3B is a diagram corresponding to FIG. 3A which plots the BEMF for each of the spindle motor windings versus the angular positions plotted in the torque curves of FIG. 3A.

FIG. 3B plots BEMF for each of spindle motor windings 104a (winding A), 104b (winding B), and 104c (winding C) versus electrical degrees corresponding to the electrical degrees of the torque curves of FIG. 3A. As illustrated in FIG. 3B, when rotor 105 of spindle motor 16 is spinning in the forward spin-direction, the BEMF of Winding A has a negative to positive zero crossing at 0° and a positive to negative zero crossing at 180°. Winding B has a negative to positive zero crossing at 120° and a positive to negative zero crossing at 300°. Winding C has a positive to negative zero crossing at 60° and a negative to positive zero crossing at 240°.

When rotor 105 is moving in a forward spin-direction, FIG. 3B indicates a present phase variable defined by a present multi-bit sequence representing a present phase position ($\theta_n$) of rotor 105 after each zero crossing and a previous phase variable defined by a previous multi-bit sequence representing a previous phase position ($\hat{\theta}_n$) of rotor 105 prior to each zero crossing. Thus, a BEMF threshold crossing, such as the zero crossing in FIG. 3B, is represented by a change in the polarity of the BEMF in one winding, and the BEMF threshold crossing defines the present phase position ($\theta_n$) of the rotor. Specifically, in FIG. 3B, the present phase position ($\theta_n$) and the previous phase position ($\hat{\theta}_n$) of rotor 105 are each represented by a phase variable defined by a multi-bit sequence representing the BEMF polarity of Winding A in bit position 0, the BEMF polarity of Winding B in bit position 1 and the BEMF polarity of Winding C in bit position 2. Table II represents, for the forward spin-direction, the relationship of the corresponding multi-bit sequences, phase variables, and phase positions for each zero crossing indicated in FIG. 3B.

TABLE II

| | | | | | | |
|---|---|---|---|---|---|---|
| | | Forward Spin-Direction | | | | |
| Zero Crossing | Present Multi-bit Sequence (BEMF Polarity in Windings C B A) | Present Phase Variable | Present Phase Position ($\theta_n$) | Previous Multi-bit Sequence (BEMF Polarity in Windings C B A) | Previous Phase Variable | Previous Phase Position ($\hat{\theta}_n$) |
| Winding A Neg. to Pos. at 0° | 101 | 5 | 30° | Not Shown | N/A | N/A |

TABLE II-continued

Forward Spin-Direction

| Zero Crossing | Present Multi-bit Sequence (BEMF Polarity in Windings C B A) | Present Phase Variable | Present Phase Position ($\theta_n$) | Previous Multi-bit Sequence (BEMF Polarity in Windings C B A) | Previous Phase Variable | Previous Phase Position ($\hat{\theta}_n$) |
|---|---|---|---|---|---|---|
| Winding C Pos. to Neg. at 60° | 001 | 1 | 90° | 101 | 5 | 30° |
| Winding B Neg. to Pos. at 120° | 011 | 3 | 150° | 001 | 1 | 90° |
| Winding A Pos. to Neg. at 180° | 010 | 2 | 210° | 011 | 3 | 150° |
| Winding C Neg. to Pos. at 240° | 110 | 6 | 270° | 010 | 2 | 210° |
| Winding B Pos. to Neg. at 300° | 100 | 4 | 330° | 110 | 6 | 270° |
| Winding A Neg. to Pos. at 360° | 101 | 5 | 390° | 100 | 4 | 330° |
| Winding C Pos. to Neg. at 420° | 001 | 1 | 450° | 101 | 5 | 390° |

When rotor 105 of spindle motor 16 is spinning in the reverse spin-direction, FIG. 3B indicates a present phase variable defined by a present multi-bit sequence representing a present phase position ($\theta_n$) to the left of each zero crossing and a previous phase variable defined by a previous multi-bit sequence representing a previous phase position ($\hat{\theta}_n$) to the right of each zero crossing. In addition, the BEMF polarity when rotor 105 is running in the reverse spin-direction will be the opposite of the BEMF polarities when rotor 105 is operating in the forward spin-direction. Thus, in the reverse spin-direction, each of the BEMF polarity bits of the multi-bit sequences defining corresponding phase variables will be the opposite to the BEMF polarity bits for the forward spin-direction multi-bit sequences. Table III represents, for the reverse spin-direction, the relationship of the corresponding multi-bit sequences, phase variables, and phase positions for each zero crossing indicated in FIG. 3B.

TABLE III

Reverse Spin-Direction

| Zero Crossing | Present Multi-bit Sequence (BEMF Polarity in Windings C B A) | Present Phase Variable | Present Phase Position ($\theta_n$) | Previous Multi-bit Sequence (BEMF Polarity in Windings C B A) | Previous Phase Variable | Previous Phase Position ($\hat{\theta}_n$) |
|---|---|---|---|---|---|---|
| Winding A Pos. to Neg. at 0° | Not Shown | N/A | N/A | 010 | 2 | 30° |
| Winding C Neg. to Pos. at 60° | 010 | 2 | 30° | 110 | 6 | 90° |
| Winding B Pos. to Neg. at 120° | 110 | 6 | 90° | 100 | 4 | 150° |

TABLE III-continued

Reverse Spin-Direction

| Zero Crossing | Present Multi-bit Sequence (BEMF Polarity in Windings C B A) | Present Phase Variable | Present Phase Position ($\theta_n$) | Previous Multi-bit Sequence (BEMF Polarity in Windings C B A) | Previous Phase Variable | Previous Phase Position ($\hat{\theta}_n$) |
|---|---|---|---|---|---|---|
| Winding A Neg. to Pos. at 180° | 100 | 4 | 150° | 101 | 5 | 210° |
| Winding C Pos. to Neg. at 240° | 101 | 5 | 210° | 001 | 1 | 270° |
| Winding B Neg. to Pos. at 300° | 001 | 1 | 270° | 011 | 3 | 330° |
| Winding A Pos. to Neg. at 360° | 011 | 3 | 330° | 010 | 2 | 390° |
| Winding C Pos. to Neg. at 420° | 010 | 2 | 390° | 110 | 6 | 450° |

Spin-up of Spindle Motor

During the spin-up operation according to the present invention controlled by microprocessor 34 functioning as programmable start-up controller 114, comparator 138 and status register 146 together operate as a detector for monitoring the BEMF in each of the windings 104a, 104b, 104c while the voltage (+V) is removed across the windings by tri-stating all of switching elements 128. As described below for the example embodiment of the present invention illustrated in FIG. 2, the detector comprising comparator 138 and status register 146 detects the polarity of the BEMF in each of windings 104 to generate a present multi-bit sequence representing a previous phase position ($\hat{\theta}_n$) of rotor 105, and detects a change in the polarity of the BEMF in one of windings 104 to generate a previous multi-bit sequence representing a present phase position ($\theta_n$) of rotor 105. The detected change in polarity of the BEMF in the one winding represents a BEMF zero crossing in the one winding. Microprocessor 34 functioning as programmable start-up controller 114 and HIDC 32 together function as the spindle motor controller which is responsive to the previous phase position ($\hat{\theta}_n$) and the present phase position ($\theta_n$) of rotor 105 for selecting an initial commutation state for commanding spindle motor driver 56 to initiate a spin-up commutation sequence starting from the selected initial commutation state such that the voltage (+V) is sequentially applied across a selected combination of windings 104 in order to spin-up spindle motor 16 to an operating spin-rate.

The present phase variable defined by the present multi-bit sequence representing the present phase position ($\theta_n$) of rotor 105 is assembled as follows. Analog switch 136 is controlled by commutation state sequencer 122 to select the selected floating winding for the given commutation state (e.g., winding A for commutation state 0 (B-C)) to be provided to a+input of comparator 138. A−input of comparator 138 is coupled to the center tap of stater 101. Comparator 138 provides the polarity of the selected winding BEMF to status register 146 via status line 51c. Address logic 140 addresses status register 146 to permit microprocessor 34 to read status register 146 and to assemble detected phase variables corresponding to the present phase position ($\theta_n$) and the previous phase position ($\hat{\theta}_n$) at 150 in RAM 60.

To properly assemble detected phase variables corresponding to the present phase position ($\theta_n$) and the previous phase position ($\hat{\theta}_n$) at 150 in RAM 60, a commutation state variable is also stored at 152 in RAM 60. The commutation state variable stored at 152 in RAM 60 represents the state of commutation state sequencer 122. In order to assure that the commutation state variable stored at 152 in RAM 60 is synchronized with the state of commutation state sequencer 122, microprocessor 34 commands commutation state sequencer 122 to be initialized to commutation state 0 (B-C) or some other predetermined commutation state via serial port 142 and command register 121. Thereafter, every time commutation register 144 provides a new clock pulse to increment commutation state sequencer 122, the commutation state variable stored at 152 in RAM 60 is also incremented. In this way, the commutation state variable in RAM 60 represents the current state of commutation state sequencer 122.

The following Table IV represents this process to assemble the phase variables defined by the multi-bit sequences representing the present phase position ($\theta_n$) and the previous phase position ($\hat{\theta}_n$) in RAM 60 of rotor 105. For each commutation state variable in RAM 60, a corresponding selected floating winding has its BEMF polarity detected and used to obtain the bit position of the multi-bit sequence defining the phase variable. Therefore, in order to obtain the multi-bit sequence representing previous phase position ($\hat{\theta}_n$) of rotor 105 prior to a BEMF zero crossing there needs to be at least three commutation states. The present phase position ($\theta_n$) is initialized to the previous phase position ($\hat{\theta}_n$) and then a change in BEMF polarity of one of the windings indicates the bit position to change to obtain the multi-bit sequence representing the new present phase position ($\theta_n$)

TABLE IV

| Commutation State Variable in RAM Representing Commutation State Sequencer State | Selected Winding to Detect BEMF Polarity | Bit Position of Multi-bit Sequence Defining Phase Variable |
|---|---|---|
| 0 | A | 0 |
| 1 | C | 2 |
| 2 | B | 1 |
| 3 | A | 0 |
| 4 | C | 2 |
| 5 | B | 1 |

During the programmable start-up routine, the selected initial commutation state for commanding spindle motor driver 56 to initiate a spin-up commutation sequence starting from the selected initial commutation state is obtained from an initial commutation state look-up table stored at 154 in ROM 54. An example embodiment of an initial commutation state look-up table is represented below in Table V.

TABLE V

Initial Commutation State Look-Up Table in ROM

| | Forward spin direction | | Reverse spin-direction | |
|---|---|---|---|---|
| Present Multi-bit Sequence Representing Present Phase Position ($\theta_n$) of Rotor | Previous Phase Variable Entry Having Previous Multi-bit Sequence Representing Previous Phase Position ($\hat{\theta}_n$) of Rotor | Initial Commutation State | Previous Phase Variable Entry Having Previous Multi-bit Sequence Representing Previous Phase Position ($\hat{\theta}_n$) of Rotor | Initial Commutation State |
| 001 ($\theta_1$) | 101 ($\hat{\theta}_5$) | 5 | 011 ($\hat{\theta}_3$) | 1 |
| 010 ($\theta_2$) | 011 ($\hat{\theta}_3$) | 1 | 110 ($\hat{\theta}_6$) | 3 |
| 011 ($\theta_3$) | 001 ($\hat{\theta}_1$) | 0 | 010 ($\hat{\theta}_2$) | 2 |
| 100 ($\theta_4$) | 110 ($\hat{\theta}_6$) | 3 | 101 ($\hat{\theta}_5$) | 5 |
| 101 ($\theta_5$) | 001 ($\hat{\theta}_4$) | 4 | 001 ($\hat{\theta}_1$) | 0 |
| 110 ($\theta_6$) | 010 ($\hat{\theta}_2$) | 2 | 100 ($\hat{\theta}_4$) | 4 |

As indicated in Table V, the multi-bit sequence defining the phase variable stored at 150 in RAM 60 representing the present phase position ($\theta_n$) of rotor 105 provides an index into initial commutation state look-up table 154. The present multi-bit sequence stored at 150 in RAM 60 representing the present phase position ($\theta_n$) indexes a forward spin-direction portion of the initial commutation state look-up table 154 which provides a corresponding previous phase variable entry having a previous multi-bit sequence representing the previous phase position ($\hat{\theta}_n$) of rotor 105 and which is compared to the previous multi-bit sequence stored at 150 in RAM 60 representing the previous phase position ($\hat{\theta}_n$). If there is a match, the forward spin-direction portion of look-up table 154 provides the initial commutation state. Similarly, the present multi-bit sequence stored at 150 in RAM 60 representing the present phase position ($\theta_n$) indexes a reverse spin-direction portion of initial commutation states look-up table 154 which provides a corresponding previous phase variable entry having a previous multi-bit sequence representing the previous phase position ($\hat{\theta}_n$) of rotor 105 and which is compared to the previous multi-bit sequence stored at 150 in RAM 60 representing the previous phase position ($\hat{\theta}_n$). If there is a match, the reverse spin-direction portion of look-up table 154 provides the initial commutation state.

Figure 4:
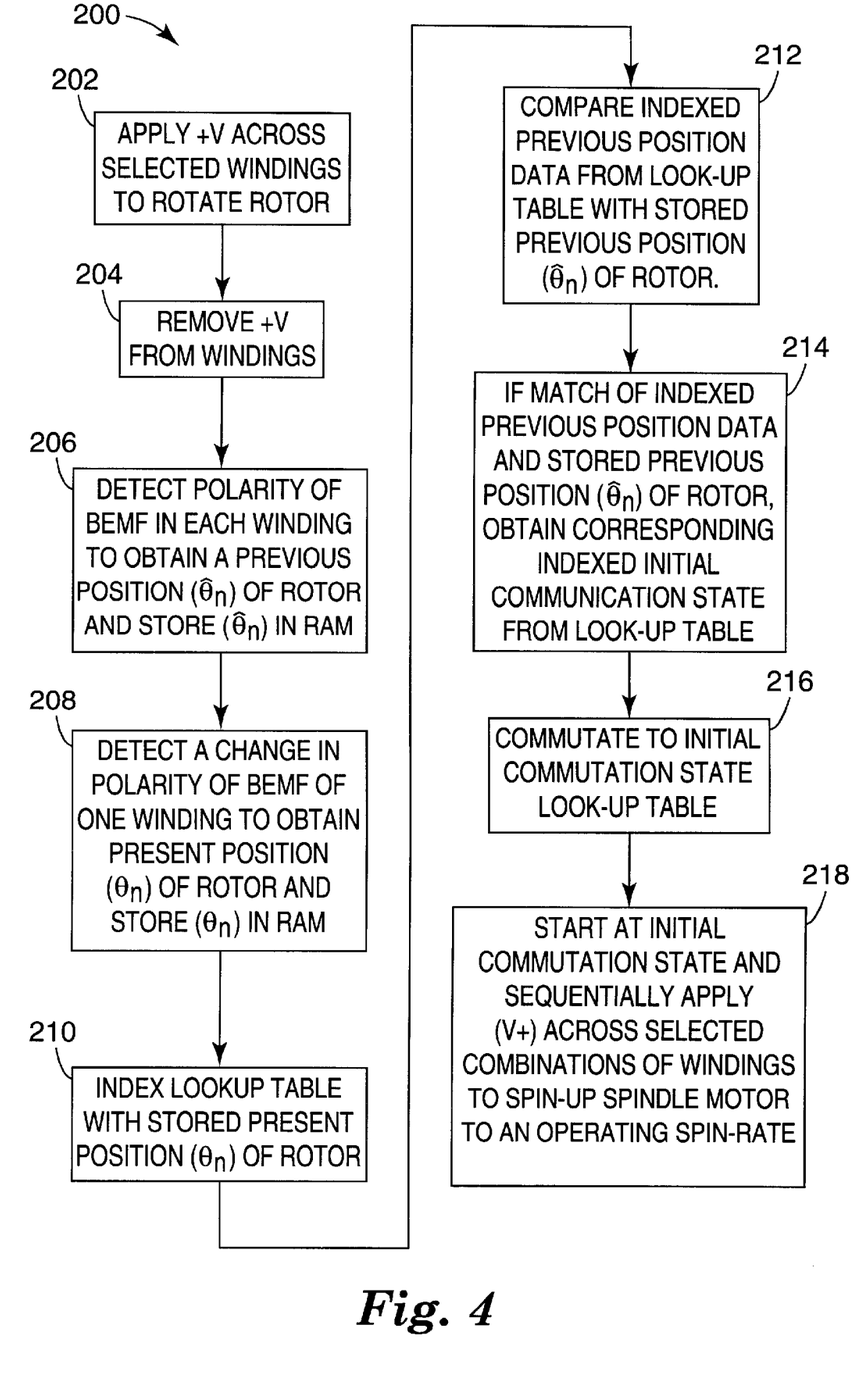
FIG. 4 is a block flow diagram illustrating a method of spinning-up a spindle motor in the hard disk drive of FIG. 1 to an operating spin-rate.

Referring to FIG. 4, a method of spinning-up spindle motor 16 to an operating spin-rate during a spin-up operation in disk drive 8 according to the present invention is illustrated generally at 200. As indicated at block 202, spindle motor driver 56 as controlled by microprocessor 34 and HIDC 32 applies a voltage (+V) across selected windings 104 to rotate rotor 105. Subsequently, microprocessor 34 and HIDC 32 command spindle motor driver 56 to remove the +V voltage from windings 104, as indicated at block 204.

As indicated at block 206, with the +V voltage removed from windings 104, commutation state sequencer 122 controls analog switch 136 to sequence through each of the windings 104 so that comparator 138 can detect the BEMF polarity in each winding 104 to be stored in status register 146. The bits of the previous multi-bit sequence representing the previous phase position ($\hat{\theta}_n$) of rotor 105 are stored at 150 in RAM 60 as serially provided from status register 146.

As indicated at block 208, commutation state sequencer 122 continues to control analog switch 136 to switch through each winding 104 so that comparator 138 and status register 146 can detect the BEMF polarity in each winding 104 to thereby detect a change in polarity of the BEMF of one winding 104 to obtain the present multi-bit sequence representing the present phase position ($\theta_n$) of rotor 105. Each bit position of the present multi-bit sequence representing the present phase position ($\theta_n$) of rotor 105 is serially stored at 150 in RAM 60 from status register 146.

As indicated at block 210, microprocessor 34 uses the present multi-bit sequence representing the present phase position ($\theta_n$) of rotor 105 stored at 150 in RAM 60 to index initial commutation state look-up table 154 stored in ROM 54. As indicated at block 212, microprocessor 34 compares the indexed previous phase position entry from the forward look-up table and from the reverse look-up table in ROM 54 with the previous phase position ($\hat{\theta}_n$) of rotor 105. As indicated at block 214, if microprocessor 34 detects a match of the previous phase position ($\hat{\theta}_n$) of rotor 105 stored in RAM 60 with the indexed previous position entry from either the forward or reverse spin-direction look-up tables stored in ROM 54, the corresponding indexed initial commutation state is obtained from the look-up table 154 in ROM 54.

As indicated at block 216, while the voltage (+V) is still removed from windings 104, microprocessor 34 and HIDC 140 functioning as the spindle motor controller command commutation state sequencer 122 of spindle motor driver 56 to commutate to the initial commutation state obtained from look-up table 154 of ROM 54. As indicated at block 218, the initial commutation state from look-up table 154 is the initial commutation state in a spin-up commutation sequence directed by programmable start-up controller 114 of microprocessor 34. Thus, the spin-up commutation sequence starts at the initial commutation state provided from look-up table 154 and sequentially applies via HIDC 32 and spindle motor driver 56 the voltage (+V) across selected combinations of windings 104 to spin-up spindle motor 16 to an operating spin-rate.

Referring to FIGS. 5A-5D, an example embodiment of a cogless spin-up routine is generally illustrated at 300. Cogless spin-up routine 300 is stored as part of programmable start-up routine 109 in ROM 54 and is performed by programmable start-up controller 114 of microprocessor 34. As indicated at block 302, in FIG. 5A, cogless spin-up routine 300 is entered to start the spin-up of spindle motor 16. As indicated at block 304, spindle motor driver 56 is commanded to apply the voltage (+V) across selected windings of spindle motor 16 to rotate rotor 105. As indicated at block 306, microprocessor 34 then waits N milliseconds to sufficiently rotate rotor 105 to get spindle assembly 15 spinning. In one example embodiment, the initial kick period indicated by blocks 304 and 306 lasts approximately 50 milliseconds. After the N milliseconds, as indicated at block 308, spindle motor driver 56 removes the voltage (+V) from the windings of spindle motor 16 by tri-stating switching elements 128.

Figure 5A:
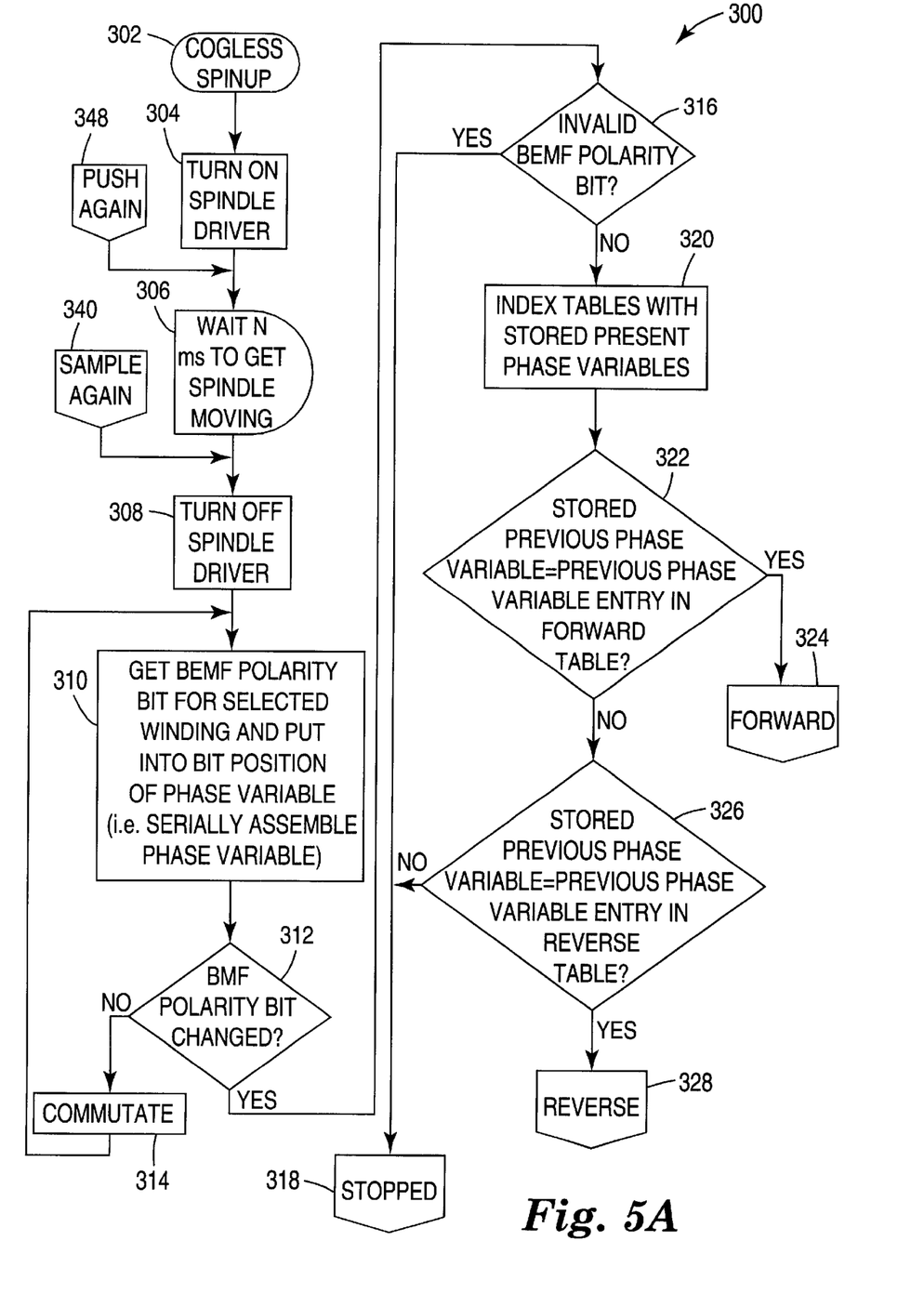
FIGS. 5A-D together form a block flow diagram of one embodiment of a cogless spin-up routine operating in the hard disk drive of FIG. 1.

As indicated at block 310, microprocessor 34 then obtains the BEMF polarity bit for the windings 104 selected by analog switch 136 via commutation state sequencer 122 and places this BEMF polarity bit into its proper bit position of the previous phase variable to serially assemble the previous phase variable defined by the previous multi-bit sequence representative of the previous phase position ($\theta_n$) of rotor 105.

As indicated at decision block 312, if the BEMF polarity bit has not changed, block 314 again commutates commutation state sequencer 122 and increments state variable 152 of RAM 60 and returns to block 310 to get the next BEMF polarity bit for the new selected winding 104. When the serially obtained BEMF polarity bit does change polarity from its previous state to indicate a BEMF a zero crossing, as tested at decision block 312, microprocessor 34 then tests to determine if this BEMF polarity bit change is invalid or valid at decision block 316. If the BEMF polarity bit change is determined to be invalid at decision block 316 cogless spin-up routine 300 proceeds to stopped sub-routine 318, which is illustrated in FIG. 5D. In an alternative embodiment, if block 312 does not detect a BEMF polarity bit change for a predetermined time-out period, such as 30 milliseconds, cogless spin-up routine 300 proceeds to stopped sub-routine 318. In one embodiment, the sampling time for blocks 310 and 312 averages approximately 6-10 milliseconds to detect a BEMF polarity bit change.

If microprocessor 34 determines that the BEMF polarity bit change is valid at decision block 316, cogless spin-up routine 302 proceeds to block 320 to index the initial commutation state look-up table 154 of ROM 54 with the stored present phase variable defined by the present multi-bit sequence stored at 150 in RAM 60.

Microprocessor 34, at decision block 322 compares the stored previous phase variable defined by the previous multi-bit sequence stored at 150 in RAM 60 to the previous phase variable entry from the forward spin-direction portion of initial commutation state look-up table 154. If the stored previous phase variable is equal to the previous phase variable entry in the forward spin-direction portion of look-up table 154, flow proceeds to the forward sub-routine 324 illustrated in FIG. 5B. If the stored previous phase variable is not equal to the previous phase variable entry in the forward spin-direction portion of look-up table 154 flow proceeds to decision block 326.

At decision block 326, the stored previous phase variable defined by the previous multi-bit sequence stored at 150 in RAM 60 is compared to the previous phase variable entry in the reverse spin-direction portion of initial commutation state look-up table 154 of ROM 54. If the stored previous phase variable is equal to the previous phase variable entry in the reverse spin-direction portion of look-up table 154, flow proceeds to reverse sub-routine 328 illustrated in FIG. 5C. If the stored previous phase variable is not equal to the previous phase variable entry in the reverse spin-direction portion of look-up table 154, flow proceeds to stopped sub-routine 318.

Figure 5B:
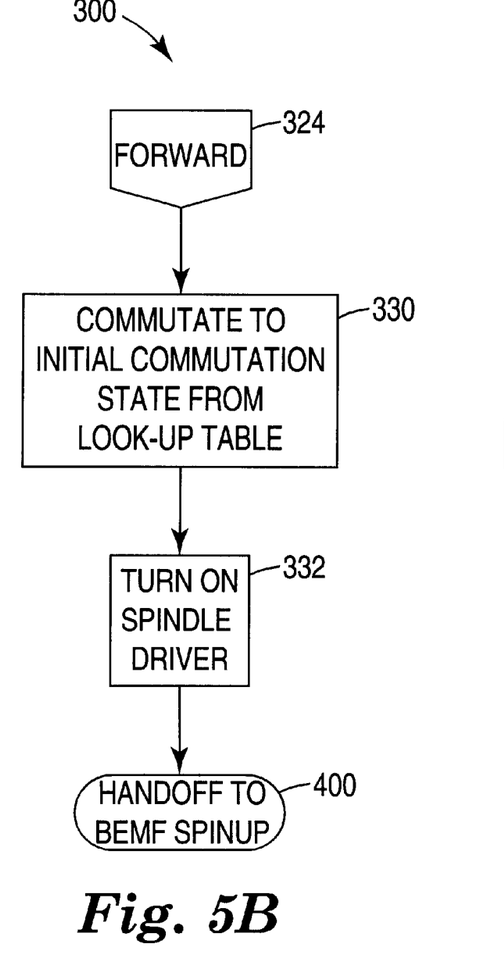

Referring to FIG. 5B, the forward sub-routine 324 proceeds to block 330 where microprocessor 34 commands commutation sequencer 122 via HIDC 32 to commutate to the initial commutation state provided from the forward spin-direction portion of initial commutation state look-up table 154. After the initial commutation state is reached, flow proceeds to block 332 where microprocessor 34 commands spindle motor driver 56 to again apply the voltage (+V) across selected windings and flow is handed off to the BEMF spin-up routine 400 which sequentially applies voltage (+V) across selected combinations of windings 104 in order to spin-up spindle motor 16 to an operating spin-up rate while monitoring the BEMF of spindle motor 16 to measure spin-rate.

Figure 5C:
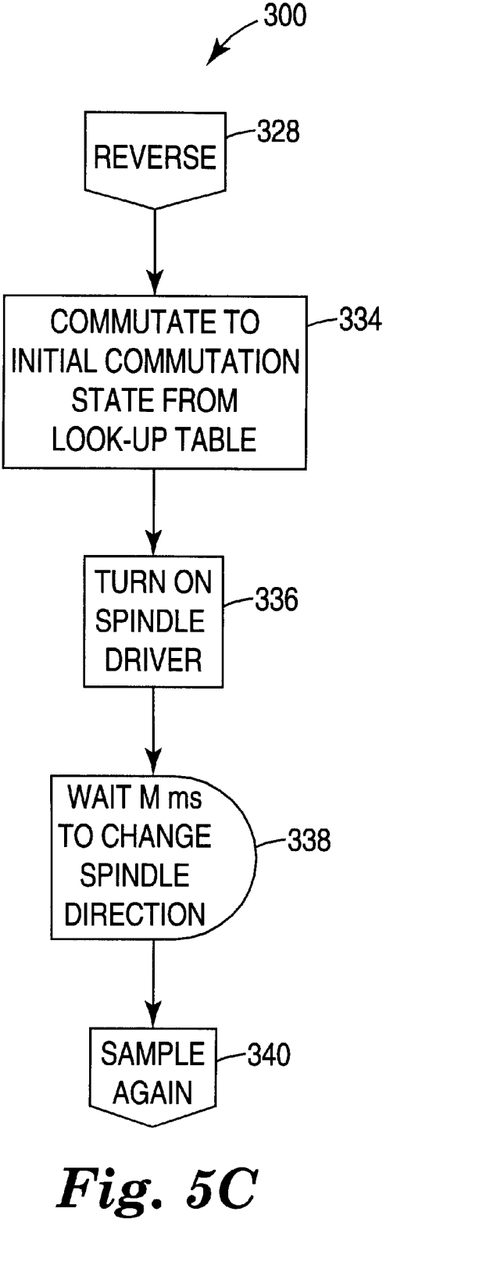
Figure 5D:
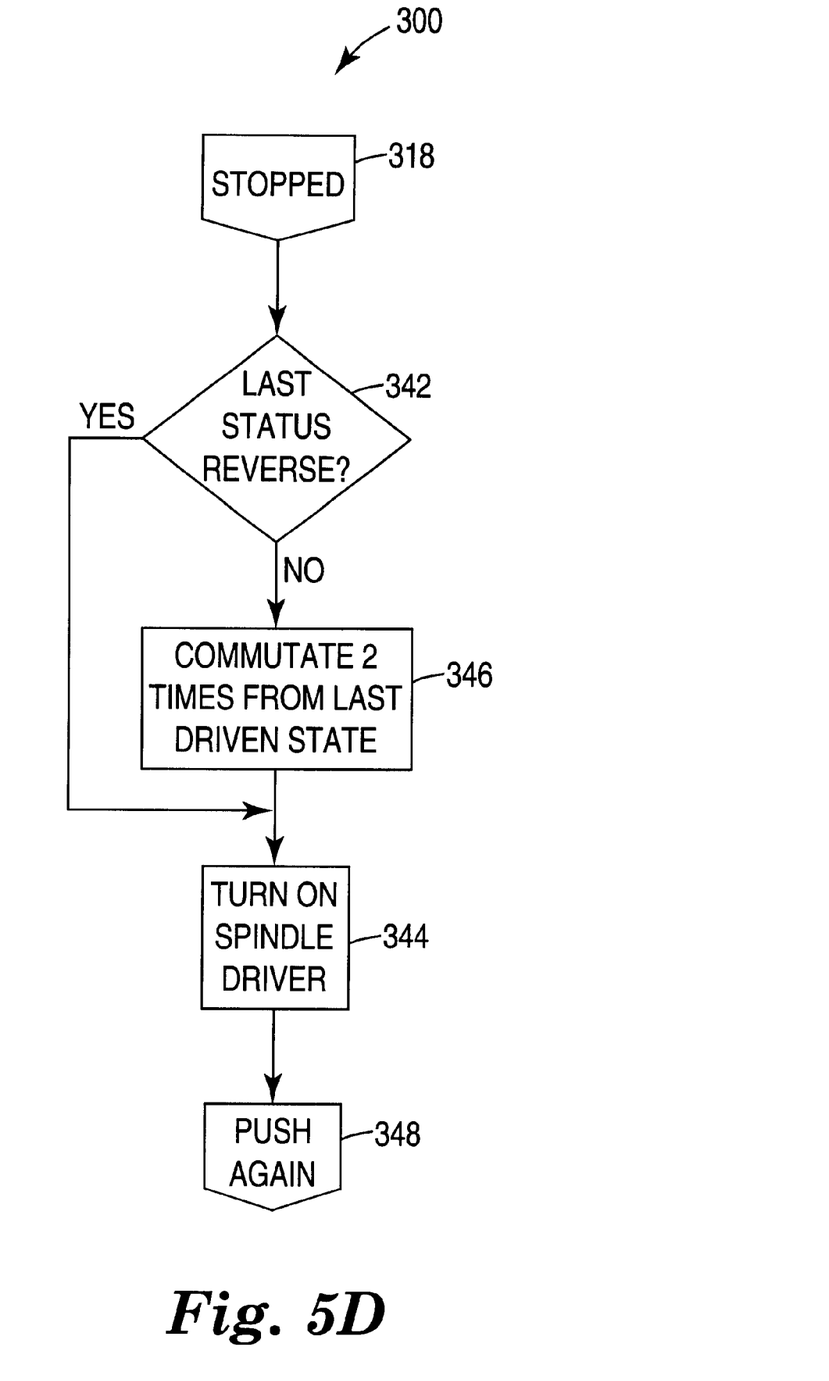

Referring to FIG. 5C, reverse sub-routine 328 proceeds to block 334 where microprocessor 34 commands commutation state sequencer 122 to commutate to the initial commutation state provided from the reverse spin-direction portion of initial commutation state look-up table 154. After the initial commutation state is reached, microprocessor 34, at block 336 begins to sequentially apply the voltage (+V) across selected combinations of windings 104 and flow proceeds to block 338 where microprocessor 34 waits M milliseconds to change the spin-direction of rotation of rotor 105 to a forward spin-direction. Flow then proceeds to sample again entry point 340 which is illustrated in FIG. 5A where flow proceeds to block 308 where switching element of spindle motor driver 56 are again tri-stated and another BEMF polarity sample is obtained as described above in reference to FIG. 5A to determine if rotor 105 spin-direction has been changed to the forward spin-direction.

Referring to FIG. 5D, stopped sub-routine 318 proceeds to decision block 342 where microprocessor 34 determines if the last status was a reverse spin-direction or a forward spin-direction. If at decision block 342, the last status was a reverse spin-direction flow, proceeds to block 344 where microprocessor 34 via HIDC 32 controls spindle motor driver 56 to apply the voltage (+V) across selected windings 104. If the last status indicates that the spin-direction is a forward spin-direction, microprocessor 34 commands commutation state sequencer 122 via HIDC 32 to commutate from its previous commutation state and flow passes to block 344 where microprocessor 34 via HIDC 32 controls spindle motor driver 56 to apply the voltage (+V) across selected windings 104. From block 344, flow passes to the push-again entry point 348 illustrated in FIG. 5A where cogless spin-up routine 300 at block 306 waits N milliseconds to get spindle motor 16 moving and flow passes to block 308, 310, and 312 to again sample the BEMF polarity bit for selected windings 104.

The cogless spin-up routine 300 according to the present invention replaces the conventional cogging, blind table, and sync up operations described in the Background Section of the present applications, and the cogless spin-up routine 300 provides a substantially faster spin-up operation for single and multiple platter disk drives (e.g., an example cogless spin-up routine 300 takes from approximately 56 to 80 milliseconds as compared to an example approximately 1.7 seconds to perform the conventional cogging, blind table, and sync up operations for an example multi-platter disk drive, resulting in substantially faster spin-up operation).

We claim:

1. A method of spinning-up a spindle motor to an operating spin-rate during a spin-up operation in a disk drive, the spindle motor having a plurality of windings and a rotatable rotor, the method comprising the steps of:

a. applying a voltage across at least one of the windings at an initial time to cause the rotor to begin to rotate, the rotating rotor inducing a BEMF having a polarity across each of the windings;

b. removing the voltage applied at the initial time and while the voltage is removed performing the steps of:
  i. detecting the polarity of the BEMF in each of the windings to generate a previous multi-bit sequence representing a previous phase position of the rotor;
  ii. detecting a change in the polarity of the BEMF in one of the windings to generate a present multi-bit sequence representing a present phase position of the rotor;
  iii. using the present multi-bit sequence to index a plurality of previous position data of the rotor;
  iv. using the previous multi-bit sequence and the indexed plurality of previous position data of the rotor for selecting an initial commutation state in a spin-up commutation sequence such that the voltage is sequentially applied across a selected combination of the windings in order to spin-up the spindle motor, free of cogging the spindle motor, to the operating spin-rate.

2. The method of claim 1 wherein the change in the polarity of the BEMF represents a BEMF threshold crossing in the one winding, the BEMF threshold crossing defining the present phase position of the rotor.

3. The method of claim 1 wherein step b determines a direction of the rotor is a forward direction, and wherein the method further comprises the step of:
  applying the voltage across the plurality of windings to cause the rotor to continue to rotate in the forward direction.

4. The method of claim 3 further comprising the step of:
  monitoring the Bemf of at least one of the windings while applying the voltage to at least one other winding.

5. The method of claim 1 wherein step b determines a direction of the rotor is a reverse direction, and wherein the method further comprises the steps of:
  applying the voltage across at least one winding for a selected time period; and
  repeating step b.

6. The method of claim 5 wherein after repeating step b, the direction of the rotor is a forward direction, and wherein the method further comprises the step of:
  applying the voltage across the plurality of windings to cause the rotor to continue to rotate in the forward direction.

7. The method of claim 1 wherein step b(ii) fails to detect a change in the polarity of the BEMF in one of the windings within a selected time period and wherein the method further comprises repeating steps a and b.

8. The method of claim 1 wherein in step a the voltage is applied across the at least one winding for a selected time period.

9. A disk drive connectable to a power supply voltage, The disk drive comprising;
  a spindle motor having a plurality of windings and a rotatable rotor;
  a spindle motor driver connected to the windings and connectable to the voltage;
  a spindle motor controller for commanding the spindle motor driver to apply The voltage across at least one of the windings at an initial time to cause the rotor to begin to rotate, the rotating rotor inducing a HEMP having a polarity across each of the windings, the spindle motor controller subsequently commanding the spindle motor driver to remove the voltage applied across the windings at the initial time; and
  a detector for monitoring the BEMF in each of the windings while the voltage is removed across the windings and performing the steps of:
    i. detecting the polarity of the BEMF in each of the windings to generate a previous multi-bit sequence representing a previous phase position of the rotor;
    ii. detecting a change in the polarity of the BEMF in one of the windings to generate a present multi-bit sequence representing a present phase position of the rotor;
    iii. using the present multi-bit sequence to index a plurality of previous position data of the rotor;
  wherein the spindle motor controller is responsive to the previous multi-bit sequence and the indexed plurality of previous position data of the rotor for selecting an initial commutation state the commanding the spindle motor driver to initiate a spin-up commutation sequence starting from the selected initial commutation state such that the voltage is sequentially applied across a selected combination of the windings in order to spin-up the spindle motor, free of cogging the spindle motor, to an operating spin-rate.

10. The disk drive of claim 9 wherein the spindle motor controller commands the spindle motor driver to apply the voltage for a selected time period and removes the applied voltage across the at least one winding after the selected time period.

11. The disk drive of claim 9 wherein the spindle motor controller indexes a look-up table with the present phase position of the rotor to select the initial commutation state.

12. The disk drive of claim 11 wherein the look-up table includes a forward rotor spin-direction portion and a reverse rotor spin-direction portion.

13. The disk drive of claim 11 wherein spindle motor controller compares the detected previous phase position of the rotor with an indexed previous phase position of the rotor entry in the look-up table indexed by the detected present phase position of the rotor.

* * * * *